(12) United States Patent
Salter et al.

(10) Patent No.: US 10,723,258 B2
(45) Date of Patent: Jul. 28, 2020

(54) VEHICLE LAMP ASSEMBLY

(71) Applicant: Ford Global Technologies, LLC, Dearborn, MI (US)

(72) Inventors: Stuart C. Salter, White Lake, MI (US); Annette Lynn Huebner, White Lake, MI (US); Paul Kenneth Dellock, Northville, MI (US); James J. Surman, Clinton Township, MI (US); David Brian Glickman, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/862,174

(22) Filed: Jan. 4, 2018

(65) Prior Publication Data

US 2019/0202347 A1 Jul. 4, 2019

(51) Int. Cl.
| | | |
|---|---|---|
| *B60Q 1/32* | (2006.01) | |
| *B60Q 1/24* | (2006.01) | |
| *B60Q 1/26* | (2006.01) | |
| *F21S 41/141* | (2018.01) | |
| *F21S 41/663* | (2018.01) | |
| *F21S 43/15* | (2018.01) | |
| *F21S 43/14* | (2018.01) | |
| *F21S 43/19* | (2018.01) | |
| *F21Y 115/10* | (2016.01) | |
| *F21W 102/40* | (2018.01) | |
| *F21W 107/10* | (2018.01) | |

(52) U.S. Cl.
CPC .............. *B60Q 1/323* (2013.01); *B60Q 1/24* (2013.01); *B60Q 1/2665* (2013.01); *F21S 41/141* (2018.01); *F21S 41/663* (2018.01); *F21S 43/14* (2018.01); *F21S 43/15* (2018.01); *F21S 43/19* (2018.01); *F21W 2102/40* (2018.01); *F21W 2107/10* (2018.01); *F21Y 2115/10* (2016.08)

(58) Field of Classification Search
None
See application file for complete search history.

(56) References Cited

U.S. PATENT DOCUMENTS

| | | | |
|---|---|---|---|
| 2,486,859 | A | 11/1949 | Meijer et al. |
| 5,053,930 | A | 10/1991 | Benavides |
| 5,434,013 | A | 7/1995 | Fernandez |
| 5,709,453 | A | 1/1998 | Krent et al. |
| 5,839,718 | A | 11/1998 | Hase et al. |
| 6,031,511 | A | 2/2000 | DeLuca et al. |
| 6,117,362 | A | 9/2000 | Yen et al. |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Ashok Patel
(74) *Attorney, Agent, or Firm* — David Coppiellie; Price Heneveld LLP (57) ABSTRACT

A lamp assembly is provided herein. The lamp assembly includes first and second light sources operably coupled to an exterior portion of a vehicle. The first light source illuminates a front door and the second light source illuminates a rear door. A controller is configured to activate the first and second light sources to selectively illuminate the front or rear doors to indicate a predefined door of entry into the vehicle.

20 Claims, 8 Drawing Sheets

(56) References Cited

U.S. PATENT DOCUMENTS

| | | |
|---|---|---|
| 6,294,990 B1 | 9/2001 | Knoll et al. |
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Thompson et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,068,160 B2 | 6/2006 | Tourneur et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,347,576 B2 | 3/2008 | Wang et al. |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,286,378 B2 | 10/2012 | Martin et al. |
| 8,317,329 B2 | 11/2012 | Seder et al. |
| 8,317,359 B2 | 11/2012 | Harbers et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,459,832 B2 | 6/2013 | Kim |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,653,553 B2 | 2/2014 | Yamazaki et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,905,610 B2 | 12/2014 | Coleman et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthan et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,067,530 B2 | 6/2015 | Bayersdorfer et al. |
| 9,187,034 B2 | 11/2015 | Tarahomi et al. |
| 9,299,887 B2 | 3/2016 | Lowenthal et al. |
| 9,315,148 B2 | 4/2016 | Schwenke et al. |
| 9,421,902 B2 | 8/2016 | Kowatzki |
| 9,452,709 B2 | 9/2016 | Aburto Crespo |
| 9,568,659 B2 | 2/2017 | Verger et al. |
| 9,616,812 B2 | 4/2017 | Sawayanagi |
| 9,849,829 B1 * | 12/2017 | Salter .................. B60Q 1/0005 |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2005/0189795 A1 | 9/2005 | Roessler |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2008/0205075 A1 | 8/2008 | Hikmet et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2011/0115377 A1 * | 5/2011 | Wang .................. B60Q 1/2665 315/77 |
| 2011/0265360 A1 | 11/2011 | Podd et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0050979 A1 | 2/2013 | Van De Ven et al. |
| 2013/0092965 A1 | 4/2013 | Kijima et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0085488 A1 | 3/2015 | Grote, III et al. |
| 2015/0109602 A1 | 4/2015 | Martin et al. |
| 2015/0138789 A1 | 5/2015 | Singer et al. |
| 2015/0138818 A1 * | 5/2015 | Salter ................ H05B 37/0218 362/510 |
| 2015/0267881 A1 | 9/2015 | Salter et al. |
| 2015/0307033 A1 | 10/2015 | Preisler et al. |
| 2015/0323149 A1 * | 11/2015 | Salter ...................... F21S 43/13 362/510 |
| 2016/0016506 A1 | 1/2016 | Collins et al. |
| 2016/0102819 A1 | 4/2016 | Misawa et al. |
| 2016/0131327 A1 | 5/2016 | Moon et al. |
| 2016/0207443 A1 | 7/2016 | Widdowson et al. |
| 2016/0236613 A1 | 8/2016 | Trier |
| 2016/0240794 A1 | 8/2016 | Yamada et al. |
| 2017/0158125 A1 | 6/2017 | Schuett et al. |
| 2017/0210282 A1 | 7/2017 | Rodriguez Barros |
| 2017/0253179 A1 | 9/2017 | Kumada |
| 2017/0327030 A1 * | 11/2017 | Kim ...................... B60Q 1/115 |

FOREIGN PATENT DOCUMENTS

| | | |
|---|---|---|
| CN | 201193011 Y | 2/2009 |
| CN | 204127823 U | 1/2015 |

(56) References Cited

FOREIGN PATENT DOCUMENTS

| DE | 4120677 A1 | 1/1992 |
|----|------------|--------|
| DE | 29708699 U1 | 7/1997 |
| DE | 10319396 A1 | 11/2004 |
| EP | 1793261 A1 | 6/2007 |
| EP | 2778209 A1 | 9/2014 |
| GB | 2491258 A | 11/2012 |
| GB | 2517789 A | 3/2015 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |

* cited by examiner

VEHICLE LAMP ASSEMBLY

FIELD OF THE INVENTION

The present disclosure generally relates to vehicle lamp assemblies, and more particularly, to vehicle lamp assemblies disposed on an exterior portion of a vehicle.

BACKGROUND OF THE INVENTION

Vehicle illumination may provide a wide range of functions for an occupant of the vehicle. It is therefore desired to implement such structures in vehicles for various applications.

SUMMARY OF THE INVENTION

According to one aspect of the present disclosure, a lamp assembly is provided herein. The lamp assembly includes first and second light sources operably coupled to an exterior portion of a vehicle, wherein the first light source illuminates a front door and the second light source illuminates a rear door. A controller is configured to activate the first and second light sources to selectively illuminate the font or rear doors to indicate a predefined door of entry into the vehicle.

According to another aspect of the present disclosure, a lamp assembly is provided herein. The lamp assembly includes first and second light sources configured to couple to a vehicle. The first light source illuminates a front door and the second light source illuminates a rear door. A controller is configured to activate the first and second light sources to selectively illuminate the front or rear doors to indicate a predefined door of entry into the vehicle based on a vacant position within the vehicle.

According to yet another aspect of the present disclosure, a lamp assembly is provided herein. The lamp assembly includes first and second light sources configured to couple to a vehicle. A controller is configured to activate the first and second light sources to selectively illuminate a first area including a front door and a ground surface proximate the front door or a second area including a rear door and a ground surface proximate the rear door to indicate a predefined door of entry into the vehicle.

These and other aspects, objects, and features of the present invention will be understood and appreciated by those skilled in the art upon studying the following specification, claims, and appended drawings.

DETAILED DESCRIPTION OF THE PREFERRED EXAMPLES

Figure 2:
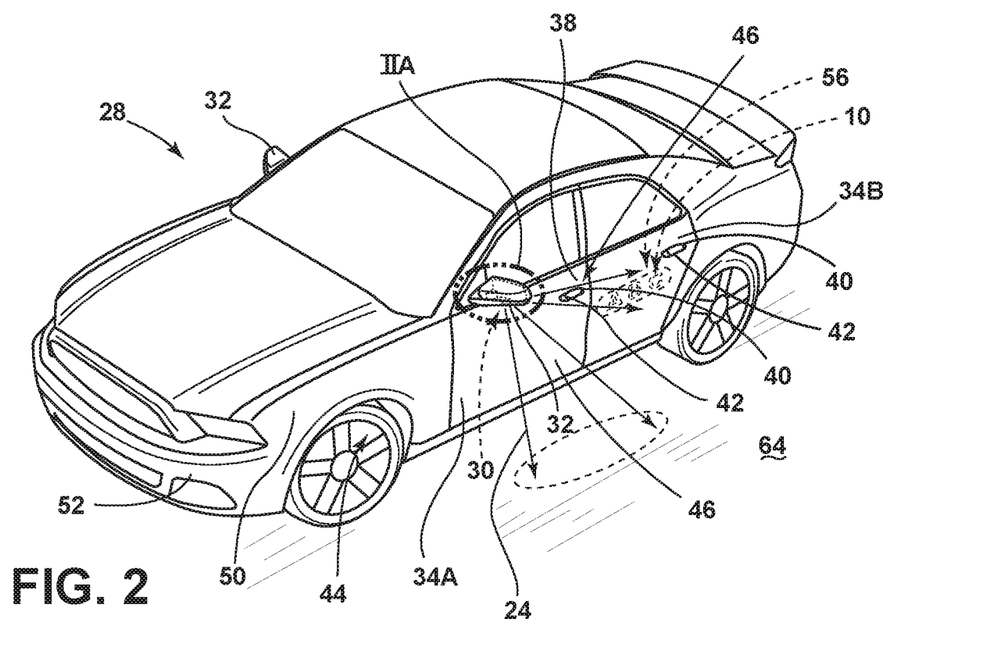
FIG. 2 is a front perspective view of an automotive vehicle employing a lamp assembly in an exterior member of a vehicle, according to some examples.

For purposes of description herein, the terms "upper," "lower," "right," "left," "rear," "front," "vertical," "horizontal," "inward," "outward," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a lamp assembly for a vehicle. The lamp assembly may advantageously employ a light source that projects light onto the vehicle and/or a ground surface proximate the vehicle. The projected light may direct incoming and/or exiting occupants of a desired door for usage by the occupant. The projected light may also notify nearby persons of the ajar door. The vehicle may further employ one or more luminescent structures that illuminate in response to predefined events. The one or more luminescent structures may be configured to receive an excitation light and re-emit a converted light at a different wavelength typically found in the visible wavelength spectrum.

Figure 1A:
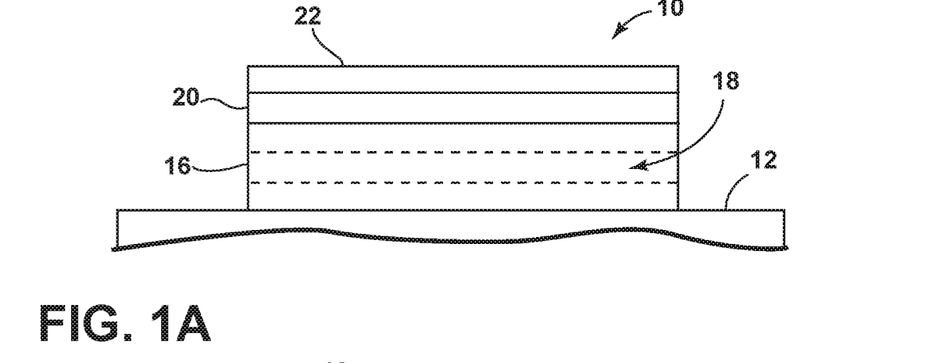
FIG. 1A is a side view of a luminescent structure rendered as a coating, according to some examples.
Figure 1B:
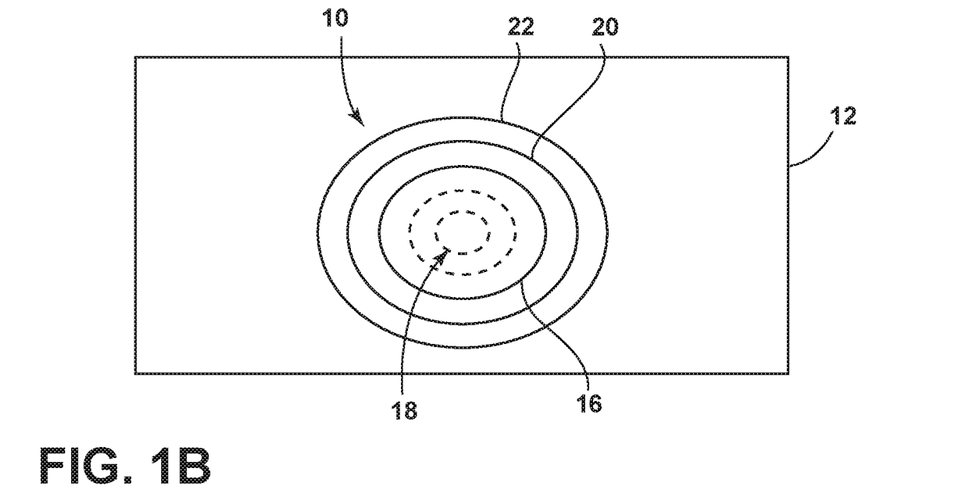
FIG. 1B is a top view of a luminescent structure rendered as a discrete particle, according to some examples.
Figure 1C:
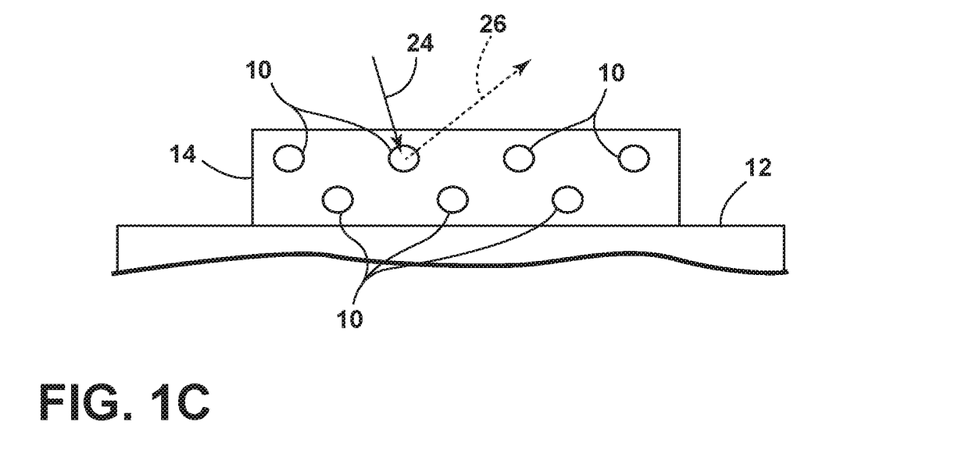
FIG. 1C is a side view of a plurality of luminescent structures rendered as discrete particles and incorporated into a separate structure.

Referring to FIGS. 1A-1C, various exemplary examples of luminescent structures 10 are shown, each capable of being coupled to a substrate 12, which may correspond to a vehicle fixture or vehicle-related piece of equipment. In FIG. 1A, the luminescent structure 10 is generally shown rendered as a coating (e.g., a film) that may be applied to a surface of the substrate 12. In FIG. 1B, the luminescent structure 10 is generally shown as a discrete particle capable of being integrated with a substrate 12. In FIG. 1C, the luminescent structure 10 is generally shown as a plurality of discrete particles that may be incorporated into a support medium 14 (e.g., a film) that may then be applied (as shown) or integrated with the substrate 12.

At the most basic level, a given luminescent structure 10 includes an energy conversion layer 16 that may include one or more sublayers, which are exemplarily shown in broken lines in FIGS. 1A and 1B. Each sublayer of the energy conversion layer 16 may include one or more luminescent materials 18 having energy converting elements with phosphorescent or fluorescent properties. Each luminescent material 18 may become excited upon receiving an excitation light 24 of a specific wavelength, thereby causing the light to undergo a conversion process. Under the principle of down conversion, the excitation light 24 is converted into a longer-wavelength, converted light 26 that is outputted from the luminescent structure 10. Conversely, under the principle of up conversion, the excitation light 24 is converted into a shorter wavelength light that is outputted from the luminescent structure 10. When multiple distinct wavelengths of light are outputted from the luminescent structure 10 at the same time, the wavelengths of light may mix together and be expressed as a multicolor light.

The energy conversion layer 16 may be prepared by dispersing the luminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the luminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In various examples, the converted light 26 that has been down converted or up converted may be used to excite other luminescent material(s) 18 found in the energy conversion layer 16. The process of using the converted light 26 outputted from one luminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principal driving mechanism for an energy conversion process corresponding to a change in wavelength of light. In the various examples discussed herein, each of the luminescent structures 10 may operate under either conversion principle.

Referring back to FIGS. 1A and 1B, the luminescent structure 10 may optionally include at least one stability layer 20 to protect the luminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The luminescent structure 10 may also optionally include a protective layer 22 optically coupled and adhered to the stability layer 20 or other layer (e.g., the conversion layer 16 in the absence of the stability layer 20) to protect the luminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

According to various examples, the luminescent material 18 may include organic or inorganic fluorescent dyes including rylenes, xanthenes, porphyrins, and phthalocyanines. Additionally, or alternatively, the luminescent material 18 may include phosphors from the group of Ce-doped garnets such as YAG:Ce and may be a short-persistence luminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the luminescent structure 10 drops below a minimum visibility of 0.32 mcd/m$^2$. A visibility of 0.32 mcd/m$^2$ is roughly 100 times the sensitivity of the dark-adapted human eye, which corresponds to a base level of illumination commonly used by persons of ordinary skill in the art.

According to various examples, a $Ce^{3+}$ garnet may be utilized, which has a peak excitation spectrum that may reside in a shorter wavelength range than that of conventional YAG:Ce-type phosphors. Accordingly, $Ce^{3+}$ has short-persistence characteristics such that its decay time may be 100 milliseconds or less. Therefore, in various examples, the rare earth aluminum garnet type Ce phosphor may serve as the luminescent material 18 with ultra-short-persistence characteristics, which can emit the converted light 26 by absorbing purple to blue excitation light 24 emitted from the light source 48. According to various examples, a ZnS:Ag phosphor may be used to create a blue-converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short-persistence luminescent material known in the art may be utilized without departing from the teachings provided herein.

Figure 3:
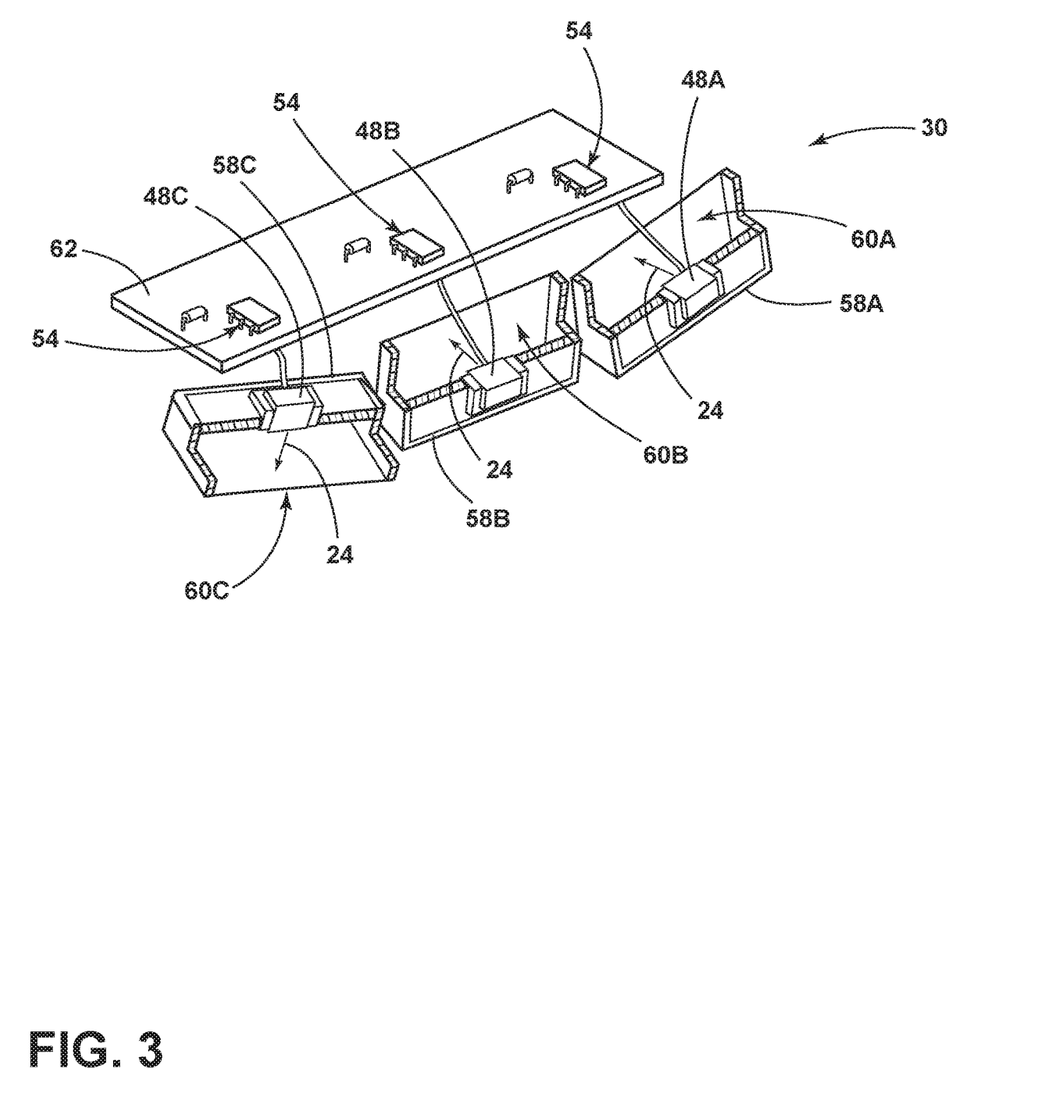
FIG. 3 is a rear perspective view of the lamp assembly, according to some examples.

Additionally, or alternatively, the luminescent material 18, according to various examples, disposed within the luminescent structure 10 may include a long-persistence luminescent material 18 that emits the converted light 26, once charged by the excitation light 24. The excitation light 24 may be emitted from any excitation source (e.g., any natural light source, such as the sun, and/or any artificial light source 48A, 48B, 48C (FIG. 3). The long-persistence luminescent material 18 may be defined as having a long decay time due to its ability to store the excitation light 24 and release the converted light 26 gradually, for a period of several minutes or hours, once the excitation light 24 is no longer present.

The long-persistence luminescent material 18, according to various examples, may be operable to emit converted light 26 at or above an intensity of 0.32 mcd/m$^2$ after a period of 10 minutes. Additionally, the long-persistence luminescent material 18 may be operable to emit converted light 26 above or at an intensity of 0.32 mcd/m$^2$ after a period of 30 minutes and, in various examples, for a period substantially longer than 60 minutes (e.g., the period may extend 24 hours or longer, and in some instances, the period may extend 48 hours). Accordingly, the long-persistence luminescent material 18 may continually illuminate in response to excitation from any light source 48A, 48B, 48C that emits the excitation light 24, including, but not limited to, natural light sources (e.g., the sun) and/or any artificial light source 48A, 48B, 48C. The periodic absorption of the excitation light 24 from any excitation source may provide for a substantially sustained charge of the long-persistence luminescent material 18 to provide for consistent passive illumination. In various examples, a light sensor 88 (FIG. 8) may monitor the illumination intensity of the luminescent structure 10 and actuate an excitation source when the illumination intensity falls below 0.32 mcd/m$^2$, or any other predefined intensity level.

The long-persistence luminescent material 18 may correspond to alkaline earth aluminates and silicates, for example, doped di-silicates, or any other compound that is capable of emitting converted light 26 for a period of time once the excitation light 24 is no longer present. The long-persistence luminescent material 18 may be doped with one or more ions, which may correspond to rare earth elements, for example, Eu2+, Tb3+, and/or Dy3. According to one non-limiting exemplary example, the luminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The luminescent structure 10, according to various examples, may be a translucent white color, and in some instances reflective, when unilluminated. Once the luminescent structure 10 receives the excitation light 24 of a particular wavelength, the luminescent structure 10 may emit any color light (e.g., blue or red) therefrom at any desired brightness. According to various examples, a blue emitting phosphorescent material may have the structure $Li_2ZnGeO_4$ and may be prepared by a high-temperature solid-state reaction method or through any other practicable method and/or process. The afterglow may last for a duration of 2-8 hours and may originate from the excitation light 24 and d-d transitions of Mn2+ ions.

According to an alternate non-limiting exemplary example, 100 parts of a commercial solvent-borne polyurethane, such as Mace resin 107-268, having 50% solids polyurethane in toluene/isopropanol, 125 parts of a blue-green long-persistence phosphor, such as Performance Indicator PI-BG20, and 12.5 parts of a dye solution containing 0.1% Lumogen Yellow F083 in dioxolane may be blended to yield a low rare earth mineral luminescent structure 10. It will be understood that the compositions provided herein are non-limiting examples. Thus, any phosphor known in the art may be utilized within the luminescent structure 10 without departing from the teachings provided herein. Moreover, it is contemplated that any long-persistence phosphor known in the art may also be utilized without departing from the teachings provided herein.

Figure 2A:
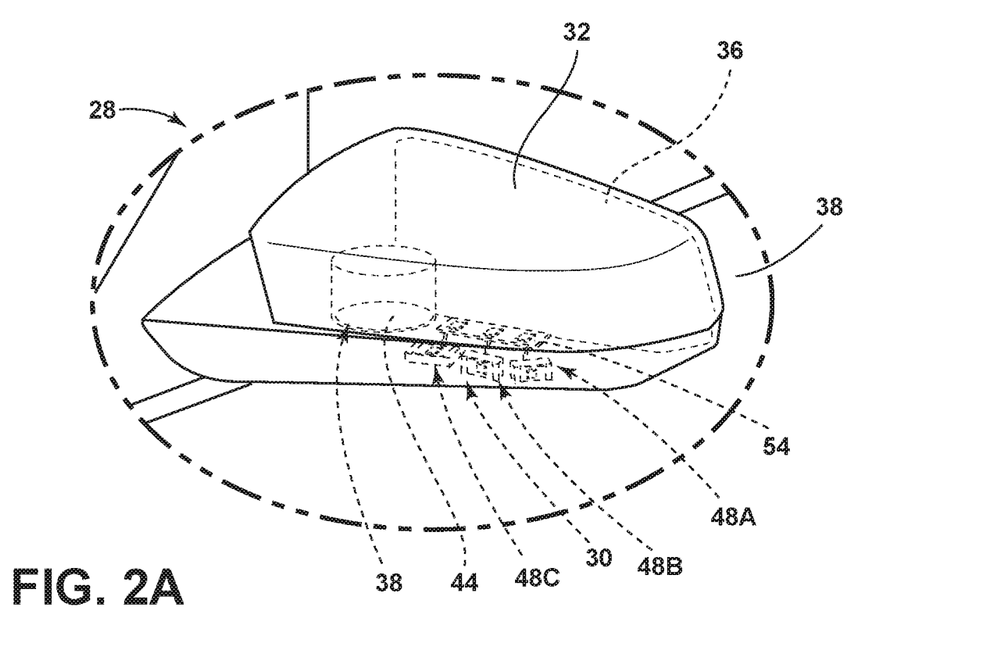
FIG. 2A is an enlarged view of section IIA of FIG. 2 illustrating the exterior member with a plurality of light sources disposed therein.

Referring to FIGS. 2 and 2A, a vehicle 28 is generally illustrated employing a lamp assembly 30. The vehicle 28 shown is one example of an occupant vehicle 28 having a pair of exterior members 32 mounted on opposing lateral sides of the vehicle 28 generally near the front side of the front occupant doors 34A, which may be configured to house a mirror 36 and/or a sensor assembly 38 therein for detecting nearby objects. The vehicle 28 may also include rear passenger doors 34B that are disposed vehicle rearwardly of the front doors 34A. The doors 34A, 34B may each include a handle 40 with a latch mechanism to enable an occupant to engage and unlatch a latch mechanism to open the door 34A, 34B for access to a cabin. The handle 40 may include a proximity sensor 42, such as a capacitive sensor, for detecting the hand of the occupant in close proximity to the handle 40. However, in some examples, the latch mechanism may be a mechanical latch and/or any other type of latch known in the art. In the depicted example, the vehicle 28 is illustrated as a sedan, but it will be understood that the vehicle 28 may be a truck, van, sports utility vehicle, or any other type of vehicle 28 without departing from the scope of teachings provided herein.

With further reference to FIGS. 2 and 2A, the vehicle 28 may be a manually operated vehicle (i.e. using a human driver) or may be autonomously driven by an onboard computer. Additionally, or alternatively, the vehicle 28 may be remotely controlled (e.g., via an operator in a different location). Autonomous vehicles sense the environment around them using a variety of sensors and/or computers. In autonomous examples, the sensor assembly 38 may incorporate a light detection and ranging (LIDAR) system 44 that measures distance by illuminating a target with laser light. Such laser light may exist in the near-infrared and/or infrared wavelength band of the electromagnetic spectrum. The sensor assembly 38 may additionally, and/or alternatively, include any other type of sensor for detecting objects proximate the vehicle 28, including but not limited to, proximity sensors and/or imaging sensors.

The lamp assembly 30 may be installed within the exterior member 32, generally in a position configured to project excitation light 24 towards a panel 46 of the vehicle 28, such as an outer panel of a front door 34A and/or a rear door 34B from one or more light sources 48A, 48B, 48C within a housing of the exterior member 32. As provided herein, the lamp assembly 30 may also project excitation light 24 towards a ground surface 64 proximate the vehicle 28. In some examples, three light sources 48A, 48B, 48C are configured in a linear array, each oriented to illuminate based on predefined events. In some examples, the first light source 48A emits a first wavelength of excitation light 24, the second light source 48B emits a second wavelength of excitation light 24, and the third light source 48C emits a third wavelength of excitation light 24. While three light sources 48A, 48B, 48C are shown and described herein as part of the lamp assembly 30, it will be appreciated that one or more light sources 48A, 48B, 48C may be employed in various configurations and orientations. It will further be appreciated that the light sources 48A, 48B, 48C may be located at different locations on the vehicle 28, such as in the vehicle door handle 40, the door 34A, 34B itself, a side fender 50, a bumper 52, a roof rail or other locations sufficient to project excitation light 24 towards a desired location.

Referring still to FIGS. 2 and 2A, the lamp assembly 30 is controlled by a controller 54 to simultaneously or independently activate the one or more light sources 48A, 48B, 48C. The one or more light sources 48A, 48B, 48C may emit excitation light 24 towards one or more panels 46 of the vehicle 28 and/or the ground surface 64. As provided in more detail herein, the controller 54 is configured to activate the first and second light sources 48A, 48B to selectively illuminate the front or rear doors 34A, 34B to indicate a predefined door of entry 34A, 34B into the vehicle 28. Moreover, the door of entry 34A, 34B into the vehicle 28 may be based on a vacant position within the vehicle 28 and the door of entry 34A, 34B may be the nearest door 34A, 34B to the vacant position.

The one or more panels 46 of the vehicle 28 may include the luminescent structure 10 thereon and/or indicia 56 may be disposed on the panel 46 of the vehicle 28. The indicia 56 may define messages that may be independently illuminable by the one or more light sources 48A, 48B, 48C. For example, a first message may be illuminated to warn pedestrians of the autonomous mode of the vehicle 28. A second message may be provided to warn a pedestrian of the approaching vehicle 28 once the pedestrian, or another object, is detected and a door 34A, 34B of the vehicle 28 is to be opened. Other messages may direct an occupant to a specific door 34A, 34B of the vehicle 28 and/or illuminate the specific door 34A, 34B for which the occupant may use. Moreover, the lamp assembly 30 may additionally illuminate a portion of the ground surface 64 that extends outwardly from an open door 34A, 34B to warn the occupant and nearby persons of the space needed for the door 34A, 34B to be placed in an ajar position. In some circumstances, persons proximate the vehicle 28 may not notice the vehicle 28 and/or be distracted, and the presence of the messages may provide additional notification to a person that is proximate to the vehicle 28. Moreover, the messages may be provided in low-light conditions, such as at night, to provide additional visibility of the vehicle 28 to pedestrians and cyclists proximate the vehicle 28. In some examples, the messages may be updated based on the operational mode of the vehicle 28 (e.g., manual or autonomous mode), the object detected (e.g., a first message may be provided to a cyclist and a second message may be provided for a pedestrian), and/or the circumstance upon which the vehicle 28 approaches the detected object.

Referring to FIG. 3, the lamp assembly 30 is illustrated having three light sources 48A, 48B, 48C for illuminating the vehicle 28 and/or the ground surface 64. The lamp assembly 30 includes a first light source 48A, a second light source 48B, and a third light source 48C, all shown arranged in an array so as to provide excitation light 24 to the various locations on and/or around the vehicle 28. In various examples, fluorescent lighting, light-emitting diodes (LEDs), organic LEDs (OLEDs), polymer LEDs (PLEDs), laser diodes, quantum dot LEDs (QD-LEDs), solid-state lighting, a hybrid of these or any other similar device, and/or any other form of lighting may be utilized within the lamp assembly 30. Further, various types of LEDs are suitable for use as the light sources 48A, 48B, 48C including, but not limited to, top-emitting LEDs, side-emitting LEDs, and/or any other type of LED known in the art.

Each of the light sources 48A, 48B, 48C may include a housing 58A, 58B, 58C. Optics may be arranged within light output windows 60A, 60B, 60C of the corresponding light sources 48A, 48B, 48C, respectively, such that excitation light 24 output by the light sources 48A, 48B, 48C is directed towards the desired locations on and/or around the vehicle 28. The lamp assembly 30 may include a circuit board 62, which may be configured as a printed circuit board (PCB), containing the controller 54 having control circuitry including LED drive circuitry for controlling activation and deactivation of the light sources 48A, 48B, 48C. The controller 54 may be disposed in the vehicle 28 and/or within the exterior member 32. The circuit board 62 may be configured in any fashion known in the art including, but not limited to, any flexible PCB and/or rigid PCB.

The controller 54 may activate the light sources 48A, 48B, 48C based on a plurality of inputs and may modify the intensity of the emitted wavelengths of excitation light 24 by pulse-width modulation, current control, and/or any other method known in the art. In various examples, the controller 54 may be configured to adjust a color and/or intensity of the excitation light 24 by sending control signals to adjust an intensity or energy output level of the light sources 48A, 48B, 48C. According to various examples, the controller 54 may increase the intensity of excitation light 24 emitted from any of the light sources 48A, 48B, 48C up to five times steady state. According to various examples, multicolored light sources 48A, 48B, 48C, such as Red, Green, and Blue (RGB) LEDs that employ red, green, and blue LED packaging may be used to generate various desired colors of light outputs from a single light source 48A, 48B, 48C, according to known light color mixing techniques.

In operation, any of the light sources 48A, 48B, 48C may be configured to emit excitation light 24 towards a door 34A, 34B of the vehicle 28 to direct a person to enter the vehicle 28 through the illuminated door 34A, 34B and/or towards the ground surface 64 proximate the desired door 34A, 34B. As provided herein, each door 34A, 34B may include the panel 46 and the indicia 56 may be disposed on the panel 46. The indicia 56 may be defined by the luminescent structure 10. The luminescent structure 10 luminesces in response to receiving the excitation light 24. The wavelength of the excitation light 24 may differ in length from that of the converted light 26 that is emitted from the luminescent structure 10. The luminescent structure 10 may assist in illuminating the desired door 34A, 34B during daytime lighting conditions.

Referring still to FIG. 3, the first window 60A may be configured to direct excitation light 24 and/or converted light 26 towards the front door 34A and/or the ground surface 64 proximate the front door 34A. In some examples, the first window 60A may direct excitation light 24 and/or converted light 26 towards a first area including the front door 34A and a ground surface 64 proximate the front door 34A to indicate a predefined door of entry into the vehicle 28. The second window 60B may be configured to direct excitation light 24 and/or converted light 26 towards the rear door 34B and/or the ground surface 64 proximate the rear door 34B. In some instances, the second window 60B may direct excitation light 24 and/or converted light 26 towards a second area including the rear door 34B and a ground surface 64 proximate the rear door 34B to indicate a predefined door of entry into the vehicle 28. The third window 60C may be configured to direct excitation light 24 towards the ground surface 64 proximate the vehicle 28 thereby forming a puddle lamp. It will be appreciated, however, that the lamp assembly 30 may have any number of light sources 48A, 48B, 48C directed at any feature of the vehicle 28 and/or any area surrounding the vehicle 28. Moreover, each light source 48A, 48B, 48C may illuminate independently, or in conjunction with one another, without departing from the scope of the present disclosure.

With further reference to FIG. 3, each light output window 60A, 60B, 60C may incorporate an interchangeable lens and can be a concave lens, convex lens, cylindrical lens, or an impression. The lens may enable one to attain indicia 56, images, messages, curves, etc., projected onto the desired panel 46 of the vehicle 28 and/or the ground surface 64 proximate the vehicle 28. As provided herein, the indicia 56 may notify persons and/or objects proximate the vehicle 28 of an operational mode of the vehicle 28. The projections may occur in low-light conditions when it may be difficult to visibly notice that a driver of the vehicle 28 is not present (i.e., the vehicle 28 is operating in an autonomous mode). The additional notification may provide additional safety and/or additional marketing of the vehicle 28.

Figure 4:
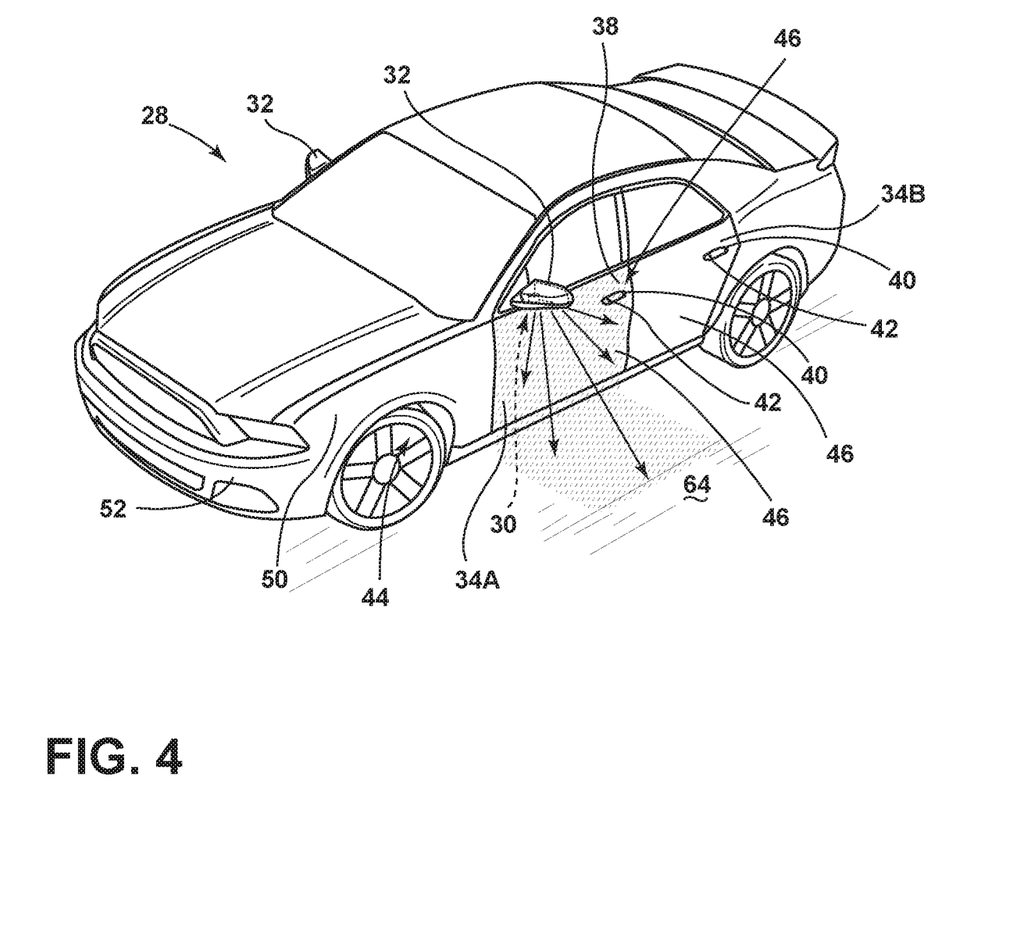
FIG. 4 is a front perspective view of the vehicle and the lamp assembly illuminating a closed front door of the vehicle, according to some examples.
Figure 5:
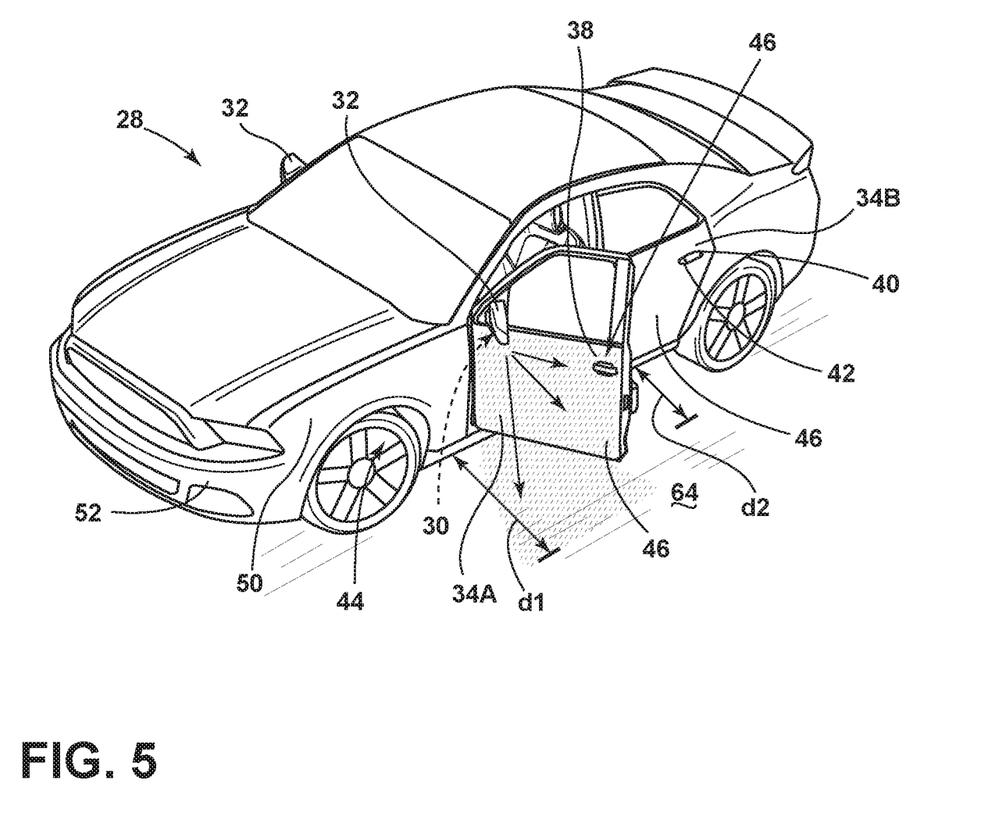
FIG. 5 is a front perspective view of the vehicle and the lamp assembly illuminating an open front door of the vehicle, according to some examples.
Figure 6:
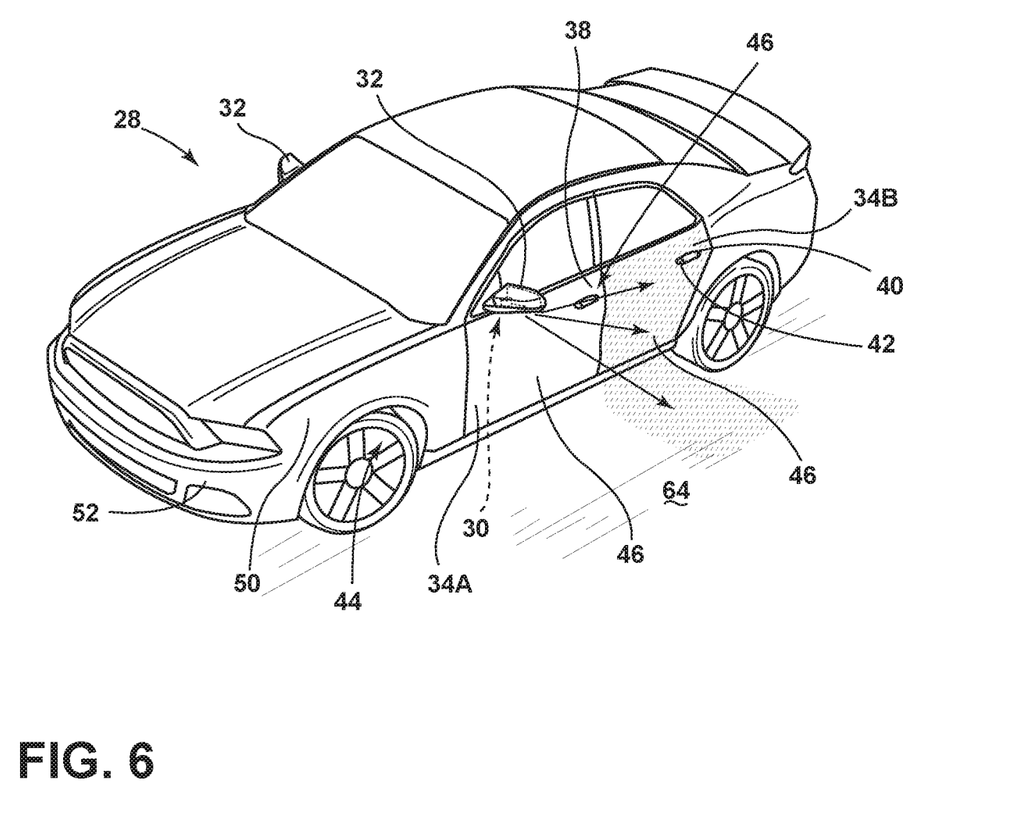
FIG. 6 is a front perspective view of the vehicle and the lamp assembly illuminating a closed rear door of the vehicle, according to some examples.
Figure 7:
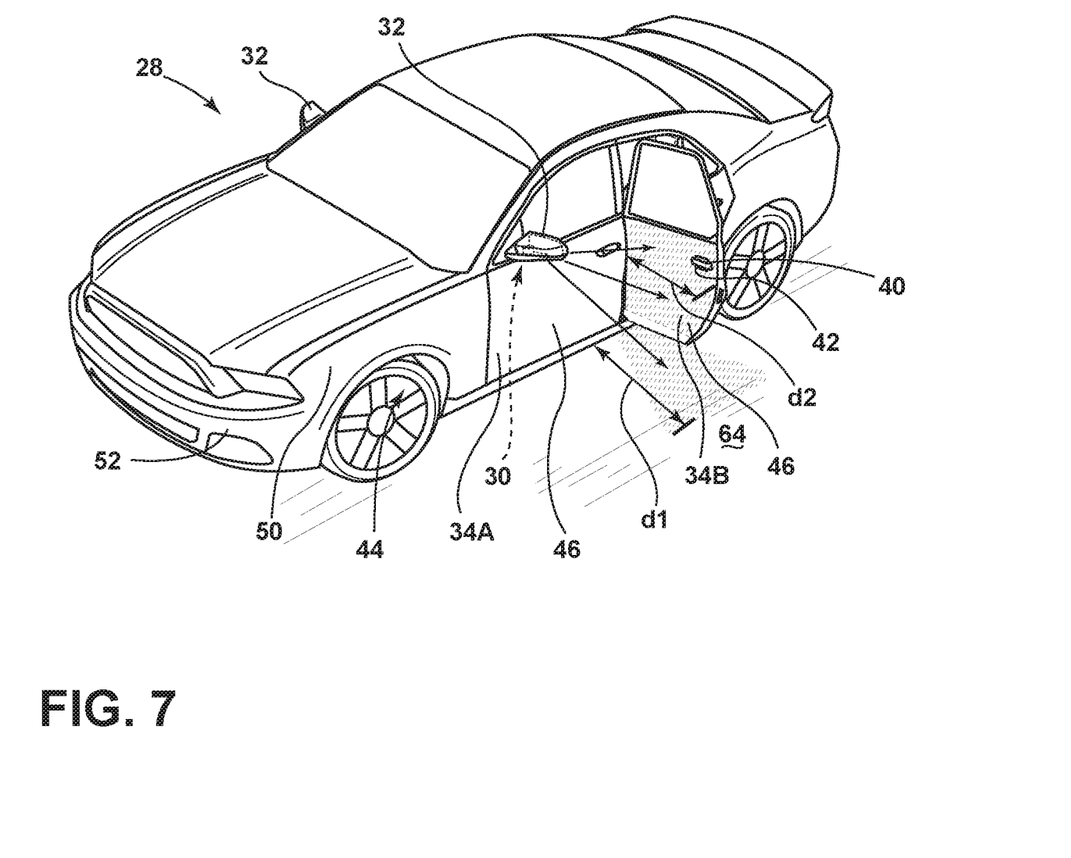
FIG. 7 is a front perspective view of the vehicle and the lamp assembly illuminating an open rear door of the vehicle, according to some examples.

Referring to FIGS. 4-7, as provided herein, the lamp assembly 30 may illuminate a panel 46 of the vehicle 28 and/or the ground surface 64 proximate the vehicle 28. Based on the current occupancy of the vehicle 28, the lamp assembly 30 may direct an incoming occupant to a desired location within the vehicle 28 and/or direct the incoming occupant to enter the vehicle 28 through a designated door 34A, 34B. For example, the lamp assembly 30 may direct an incoming occupant to a front seat position within the vehicle 28 by illuminating the front door 34A of the vehicle 28 and/or the ground surface 64 proximate the front door 34A, as illustrated in FIGS. 4 and 5. Additionally, and/or alternatively, the lamp assembly 30 may direct an incoming occupant to a rear seat position within the vehicle 28 by illuminating the rear door 34B of the vehicle 28 and/or the ground surface 64 proximate the rear door 34B, as illustrated in FIGS. 6 and 7. As provided herein, the ground surface 64 may be illuminated to a first distance $d_1$ from the vehicle 28 that is greater than or equal to a second distance $d_2$ that the door 34A, 34B may be swung away from the vehicle 28 when disposed in an ajar position.

In some examples, when the vehicle 28 is moving below a predetermined speed (e.g., five miles per hour (mph)) and coming to a stop, the designated doors 34A, 34B through which loading and/or unloading of the vehicle 28 may take place are illuminated. In addition, the lamp assembly 30 may illuminate the ground surface 64 proximate the door 34A, 34B to further direct the incoming occupant towards the designated door 34A, 34B. In some examples, the ground surface 64 may be illuminated from a position proximate the vehicle 28 to a location outwardly from the vehicle 28 the first predefined distance $d_1$. The first distance $d_1$ may be greater than or equal to the distance $d_2$ the doors 34A, 34B extend outwardly of the vehicle panel 46 while moving the door 34A, 34B from a closed position to an ajar position. Accordingly, the first distance $d_1$ may illustrate the space suggested for the door 34A, 34B to be opened without contacting any other objects.

In some examples, the door 34A, 34B, and/or the panel 46, and the ground surface 64 may illuminate in a first color (e.g., amber) when a loading and/or condition is activated. Accordingly, the door 34A, 34B and/or the ground surface 64 may be illuminated when there is an occupant that is to exit the vehicle. Additionally, and/or alternatively, the door 34A, 34B and/or the ground surface 64 may illuminate the desired door 34A, 34B of entry based on the current occupant locations within the vehicle. For example, if a seat within the vehicle is occupied, the lamp assembly 30 may direct an incoming occupant to a door 34A, 34B proximate a vacant seat. It will be appreciated that the vehicle may determine the occupancy of the vehicle and/or the seats within the vehicle through any method known in the art without departing from the scope of the present disclosure. In some examples, as the vehicle comes to a stop and occupants are to either leave and/or enter the vehicle, the lamp assembly 30 may flash in the first color and/or any other desired color to draw attention to the loading/unloading activity.

In various examples, if an entering occupant attempts to enter the vehicle through a door 34A, 34B other than the designated door 34A, 34B and/or an occupant is already disposed within the vehicle in a seat proximate the designated door 34A, 34B, the lamp assembly 30 may illuminate the door 34A, 34B proximate the incoming occupant in a second color (e.g., red) in a steady and/or flashing manner. The incoming occupant may be detected by any sensor disposed on the vehicle and/or by the capacitive switch within the door handle 40.

In some examples, when the intended occupants are disposed within the vehicle and the doors 34A, 34B are placed in a closed position, the lamp assembly 30 may illuminate any of the doors 34A, 34B and/or the ground surface 64 in a third color (e.g., green), or any other desired color for a predetermined amount of time (e.g., five seconds). The illumination prior to the vehicle moving notifies the occupants and nearby persons of the vehicle's intention to begin moving. The lamp assembly 30 may deactivate the light sources after the predetermined amount of time (e.g., thirty seconds) expires and/or once the vehicle reaches a predefined speed (e.g., five mph). If any door handle 40 is contacted during the period between the doors 34A, 34B being shut and the light sources being deactivated, the lamp assembly 30 may flash excitation light 24 at the touched door 34A, 34B in the second color to indicate the locked and/or occupied condition of the vehicle. The vehicle may maintain its parked state until the handle 40 is no longer contacted and at which point the illumination sequence may restart.

Figure 8:
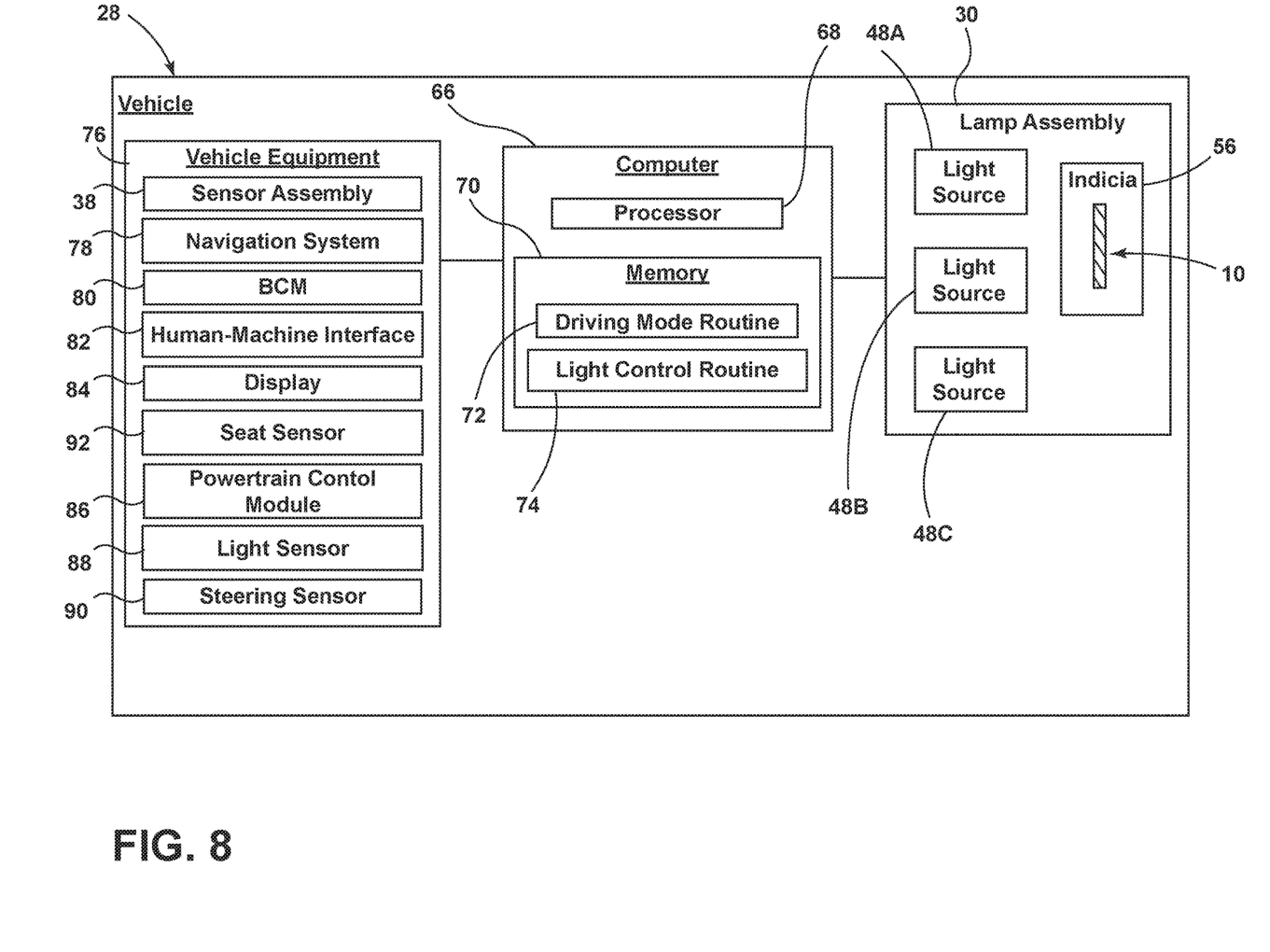
FIG. 8 is a block diagram of a vehicle employing the lamp assembly, according to some examples.

Referring to FIG. 8, the vehicle 28 may be a manually operated vehicle (i.e. using a human driver) or may be autonomously driven by an onboard computer 66. Additionally, or alternatively, the vehicle 28 may be remotely controlled (e.g., via an operator located in a different location). The vehicle 28 generally includes the computer 66 having a processor 68 and a memory 70, the memory 70 including one or more forms of computer-readable media, and storing instructions executable by the processor 68 for performing various operations. The computer 66 may generally be configured for communications on a controller area network (CAN) bus or the like. The computer 66 may also have a connection to an onboard diagnostics connector (OBD-II). Via the CAN bus, OBD-II, and/or other wired or wireless mechanisms, the computer 66 may transmit messages to various devices in the vehicle 28 and/or receive messages from the various devices, e.g., controllers, actuators, sensors, electronic devices, etc., including data collectors. In addition, the computer 66 may be configured for communicating with a network, which may include various wired and/or wireless networking technologies, e.g., cellular, Bluetooth, wired and/or wireless packet networks, etc.

The computer 66 may include a dedicated or shared controller and may include the processor 68 and memory 70, according to some examples. It should be appreciated that the computer 66 may include control circuitry such as analog and/or digital control circuitry. The memory 70 may include one or more routines, such as a driving mode routine 72 and/or a light control routine 74. According to some examples, the driving mode routine 72 may determine whether the vehicle 28 is being operated in under an autonomous mode and/or a manual mode. The light control routine 74 may illuminate the light sources 48A, 48B, 48C in a plurality of wavelengths.

A variety of vehicle equipment 76 may be in communication with the computer 66. For example, various controllers 54 in the vehicle 28 may operate as data collectors to provide data via the CAN bus, e.g., data relating to vehicle speed, acceleration, etc. Further, sensors or the like, global positioning system (GPS) equipment, navigation systems 78, etc., could be included in the vehicle 28 and configured as data collectors to provide data to the computer 66, e.g., via a wired or wireless connection. Data provided by the sensor assembly 38 could include mechanisms such as RADAR, LIDAR 44 (FIG. 2), sonar, etc. sensors that could be deployed to measure a distance between the vehicle 28 and other vehicles or objects. Yet other sensor data collectors could include cameras, breathalyzers, motion detectors, etc., i.e., data collectors to provide data for evaluating a condition or state of a vehicle 28 operator. In addition, the data collectors may include sensors to detect a position, a change in position, a rate of change in position, etc., of vehicle components such as a steering wheel, brake pedal, accelerator, gearshift lever, etc.

With continued reference to FIG. 8, the computer 66 may communicate with the vehicle equipment 76 to receive information and illuminate the lamp assembly 30 based on the provided information. In the depicted examples, the vehicle equipment 76 includes the navigation system 78, a body control module (BCM) 80, a human-machine interface (HMI) 82, a display 84, a powertrain control module (PCM) 86, a light sensor 88, a steering sensor 90, and/or a seat sensor 92, each of which provides information to the computer 66 that may be used to determine the operation of the lamp assembly 30. For example, the navigation system 78 may provide the computer 66 and/or the controller with information related to the progress of a trip (e.g., ETA, distance, etc.). The navigation system 78 may also cooperate with the lamp assembly 30 such that the lamp assembly 30 is illuminated as the vehicle 28 begins to operate and/or move in an autonomous mode. The BCM 80 and/or PCM 86 may provide the computer 66 with information related to the vehicle 28 such as a door status (e.g., locked/unlocked), a seat belt status (e.g., buckled/unbuckled), a vehicle speed, etc. to determine whether a person is disposed within the vehicle 28 and/or operating (or capable of operating) the vehicle 28.

With further reference to FIG. 8, the vehicle 28 may additionally include the HMI 82 that may be used for controlling a plurality of functions within the vehicle 28, including, but not limited to, air conditioning settings, seat settings, sound settings, and/or navigational settings. The HMI 82 may also include a display 84 that may provide any desired information about the settings and/or any other information about the vehicle 28. The display 84 may also provide any desired information about the lamp assembly 30. Moreover, the display 84 may provide information pertaining to the current trip while the vehicle 28 is in operation.

The seat sensor 92, which includes, but is not limited to, any type of proximity sensor, seat airbag sensor, pressure sensor, etc., may be utilized for detecting the presence and/or location of occupants within the vehicle. For example, if the vehicle is to pick up an occupant, the lamp assembly 30 may direct the incoming occupant to a vacant location within the vehicle. The lamp assembly 30 may direct the incoming occupant towards a position within the vehicle by illuminating the respective door 34A, 34B proximate the location and/or the ground surface 64 proximate the desired location within the vehicle.

In some examples, the vehicle 28 includes a light sensor 88 that may be utilized for varying the intensity of light 26 emitted from the lamp assembly 30. The light sensor 88 detects the environmental lighting conditions, such as whether the vehicle 28 is in day-like conditions (i.e., higher light level conditions) and/or whether the vehicle 28 is in night-like conditions (i.e., lower light level conditions). The light sensor 88 can be of any suitable type and can detect the day-like and night-like conditions in any suitable fashion. According to some examples, the colors of light and/or intensities of light emitted from the lamp assembly 30 may be varied based on the detected conditions. The light sensor 88 may be integrated into the vehicle 28 or into the lamp assembly 30. Moreover, the intensity of excitation light 24 may additionally, or alternatively, be varied with the initiation of the vehicle's headlights.

With further reference to FIG. 8, the one or more light sources 48A, 48B, 48C may illuminate one or more indicia 56, which may be defined by one or more luminescent structures 10. In response, the luminescent structures 10 may be configured to convert excitation light 24 received from the associated light source 48A, 48B, 48C into light having a wavelength in the visible spectrum. In some examples, a plurality of luminescent structures 10 may produce luminescence in response to a different wavelength of excitation light 24 emitted from the light source 48A, 48B, 48C. Accordingly, the one or more indicia 56 may independently and/or contemporaneously luminesce. In operation, the indicia 56 may direct a passenger to a desired location within the vehicle, as provided herein. Additionally, and/or alternatively, the indicia 56 may provide any other desired information to persons proximate the vehicle, including, but not limited to, a company that is transporting occupants, a symbol to signify the correct vehicle to an occupant, or any other information for an incoming occupant.

In some examples, the light source 48A, 48B, 48C may emit significant intensities of excitation light 24 to ensure that the luminescent structure 10 is luminescing near the full capacity of the luminescent structure 10 such that the indicia 56 are visible during all conditions. Since lighting conditions may vary depending on a plurality of factors including, but not limited to, the current time, date, and weather conditions, the intensity of excitation light 24 emitted from the light source 48A, 48B, 48C may be adjusted by the computer 66 such that illumination of the luminescent structure 10 may be noticed under any condition. For example, the light intensity in Florida during a clear summer afternoon will generally be higher than the light intensity in Michigan during an overcast winter morning. Thus, by making this type of information known to the computer 66, the computer 66 can adjust any light source 48A, 48B, 48C.

According to various examples, the luminescent structure 10 discussed herein is substantially Lambertian, that is, the apparent brightness of the luminescent structure 10 is substantially constant regardless of an observer's angle of view. As described herein, the color of the converted light 26 may be significantly dependent on the particular luminescent materials 18 utilized in the luminescent structure 10. Additionally, a conversion capacity of the luminescent structure 10 may be dependent on a concentration of the luminescent material 18 utilized in the luminescent structure 10. By adjusting the range of intensities that may excite the luminescent structure 10, the concentration, types, and proportions of the luminescent materials 18 in the luminescent structure 10 discussed herein may be operable to generate a range of color hues of the excitation light 24 by blending the first wavelength with the second wavelength.

As described herein, the color of the converted light 26 may be significantly dependent on the particular luminescent material 18 utilized in the luminescent structure 10. Additionally, a conversion capacity of the luminescent structure 10 may be significantly dependent on a concentration of the luminescent materials 18 utilized in the luminescent structure 10. By adjusting the range of intensities that may be emitted from the one or more light sources 48A, 48B, 48C, the concentration and proportions of the luminescent materials 18 in the luminescent structure 10 and the types of luminescent materials 18 utilized in the luminescent structure 10 discussed herein may be operable to generate a range of color hues of outputted light by blending the excitation light 24 with the converted light 26. It is also contemplated that the intensity of each one or more light sources 48A, 48B, 48C may be varied simultaneously, or independently, from any number of other light sources 48A, 48B, 48C.

A variety of advantages may be derived from the use of the present disclosure. For example, the lamp assembly projects light onto the vehicle and/or a ground surface proximate the vehicle. The projected light may direct incoming and/or exiting occupants of a desired door for use by the occupant. The projected light may also notify nearby persons of the ajar door. The lamp assembly can save significant costs, resources, and materials while adding additional illumination to the vehicle.

According to various examples, a lamp assembly is provided herein. The lamp assembly includes first and second light sources operably coupled to an exterior portion of a vehicle, wherein the first light source illuminates a front door and the second light source illuminates a rear door. A controller is configured to activate the first and second light sources to selectively illuminate the front or rear doors to indicate a predefined door of entry into the vehicle. Examples of the lamp assembly can include any one or a combination of the following features:

the first and second light sources further illuminate a ground surface proximate the front and rear doors, respectively;

the first and second light sources are disposed within an exterior member extending outwardly from the vehicle;

a third light source configured to direct an excitation light towards a ground surface proximate the vehicle forming a puddle lamp;

the first and second light sources also each illuminate a portion of a ground surface proximate the front and rear doors, respectively;

illumination of the ground surface proximate the front door extends vehicle outward of a distance the front door extends away from the vehicle in an ajar position;

illumination of the ground surface proximate the rear door extends vehicle outward of a distance the rear door extends away from the vehicle in an ajar position;

the controller varies an intensity of light emitted from the first and second light sources when a light sensor detects low-light conditions surrounding the vehicle;

an indicia disposed on a panel of the front or rear door;

the indicia are defined by a luminescent structure that luminesces in response to receiving an excitation light from the first or second light source; and/or the vehicle detects a vacant position within the vehicle and the first or second light source is configured to direct an incoming passenger towards a nearest door to the vacant position.

Moreover, a method of using a vehicle lamp assembly is provided herein. The method includes operably coupling first and second light sources to an exterior portion of a vehicle. The first light source illuminates a front door and the second light source illuminates a rear door. A controller is configured to activate the first and second light sources to selectively illuminate the front or rear doors to indicate a predefined door of entry into the vehicle.

According to some examples, a lamp assembly is provided herein. The lamp assembly includes first and second light sources configured to couple to a vehicle. The first light source illuminates a front door and the second light source illuminates a rear door. A controller is configured to activate the first and second light sources to selectively illuminate the front or rear doors to indicate a predefined door of entry into the vehicle based on a vacant position within the vehicle. Examples of the lamp assembly can include any one or a combination of the following features:

a third light source configured to direct an excitation light towards a ground surface proximate the vehicle forming a puddle lamp;

the first and second light sources further illuminate a ground surface proximate the front and rear doors, respectively; and/or the ground surface may be illuminated to a first distance from the vehicle that is greater than or equal to a second distance that the front or rear door may be swung away from the vehicle when disposed in an ajar position.

According to other examples, a lamp assembly is provided herein. The lamp assembly includes first and second light sources configured to couple to a vehicle. A controller is configured to activate the first and second light sources to selectively illuminate a first area including a front door and a ground surface proximate the front door or a second area including a rear door and a ground surface proximate the rear door to indicate a predefined door of entry into the vehicle. Examples of the lamp assembly can include any one or a combination of the following features:

the ground surface may be illuminated to a first distance from the vehicle that is greater than or equal to a second distance that the front or rear door may be swung away from the vehicle when disposed in an ajar position;

an indicia disposed on a panel of the front or rear door;

the vehicle detects a vacant position within the vehicle and the first or second light source is configured to direct an incoming passenger towards a nearest door to the vacant position; and/or a third light source configured to direct an excitation light towards a ground surface proximate the vehicle forming a puddle lamp.

It will be understood by one having ordinary skill in the art that construction of the described invention and other components is not limited to any specific material. Other exemplary examples of the invention disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle configured to operate on a ground surface, comprising:
   a front door;
   a rear door positioned vehicle-rearward of the front door;
   an exterior portion disposed generally proximate to at least one of the front door and the rear door;
   a lamp assembly, comprising:
      first and second light sources operably coupled to the exterior portion, wherein the first light source is operable to project a first excitation light onto the front door and the second light source is operable to project a second excitation light onto the rear door of the vehicle; and
   circuitry electrically coupled to the first and second light sources and having a controller that is operable to activate the first and second light sources, the controller selectively activating one of the first light source and the second light source to illuminate a predefined door of entry, wherein the controller activates the first light source when the predefined door of entry is the front door and activates the second light source when the predefined door of entry is the rear door.

2. The vehicle of claim 1, wherein when the first light source is activated, the first light source further projects the first excitation light onto the ground surface to illuminate a portion of the ground surface proximate to the front door, and when the second light source is activated, the second light source further projects the second excitation light onto the ground surface to illuminate a portion of the ground surface proximate to the rear door.

3. The vehicle of claim 2, wherein the illuminated portion of the ground surface proximate the front door extends vehicle outward a first distance, and the front door extends vehicle outward a second distance while disposed in an ajar position.

4. The vehicle of claim 3, wherein the first distance is greater than the second distance.

5. The vehicle of claim 3, wherein the first distance is generally equal to the second distance.

6. The vehicle of claim 5, wherein the front door is fully open while in the ajar position.

7. The vehicle of claim 2, wherein the illuminated portion of the ground surface proximate the rear door extends vehicle outward a first distance, and the rear door extends vehicle outward a second distance while disposed in an ajar position.

8. The vehicle of claim 7, wherein the first distance is greater than the second distance.

9. The vehicle of claim 7, wherein the first distance is generally equal to the second distance.

10. The vehicle of claim 9, wherein the rear door is fully open while in the ajar position.

11. The vehicle of claim 1, further comprising:
    a third light source electrically coupled to the controller and configured to direct a third excitation light towards the ground surface to form a puddle lamp.

12. The vehicle of claim 1, wherein the first and second light sources are disposed within an exterior member that extends in a vehicle-outward direction.

13. The vehicle of claim 1, further comprising:
    a light sensor electrically coupled to the controller and configured to detect light conditions surrounding the vehicle, wherein the controller is configured to control the first and second light sources to vary an intensity of the light emitted from the first and second light sources in response to the light sensor detecting low-light conditions surrounding the vehicle.

14. The vehicle of claim 1, further comprising:
a front seat disposed generally proximate to the front door; and
a rear seat disposed vehicle rearward of the front seat, wherein the controller is configured to activate the first light source when the predefined entry door is the front door based on the front seat being vacant, and the controller is configured to activate the second light source when the predefined entry door is rear door based on the rear seat being vacant.

15. A vehicle configured to operate on a ground surface, comprising:
a front door;
a rear door positioned vehicle-rearward of the front door;
a front seat disposed generally proximate to the front door;
a rear seat disposed vehicle rearward of the front seat;
an exterior portion disposed generally proximate to at least one of the front door and the rear door;
a lamp assembly, comprising:
first and second light sources operably coupled to the exterior portion, wherein the first light source is operable to project a first excitation light onto the front door and the second light source is operable to project a second excitation light onto the rear door of the vehicle; and
circuitry electrically coupled to the first and second light sources and having a controller activating at least one of the first and second light sources, wherein the controller activates the first light source based on the front seat being vacant, and the controller activates the second light source based on the rear seat being vacant.

16. The vehicle of claim 15, wherein when the first light source is activated, the first light source further projects the first excitation light onto the ground surface to illuminate a portion of the ground surface proximate to the front door, and when the second light source is activated, the second light source further projects the second excitation light onto the ground surface to illuminate a portion of the ground surface proximate to the rear door.

17. The vehicle of claim 16, wherein the illuminated portion of the ground surface proximate the front door extends vehicle outward a first distance, and the front door extends vehicle outward a second distance while disposed in an ajar position.

18. The vehicle of claim 17, wherein the first distance is greater than the second distance.

19. The vehicle of claim 17, wherein the first distance is generally equal to the second distance when the front door is fully open.

20. The vehicle of claim 15, wherein the first and second light sources are disposed within an exterior member that extends in a vehicle-outward direction.

* * * * *